United States Patent [19]

Sacco et al.

[11] Patent Number: 5,435,618
[45] Date of Patent: Jul. 25, 1995

[54] PASSENGER COMPARTMENT WITH A TRANSVERSE STIFFENER ARRANGED IN THE REGION OF THE SEATS

[75] Inventors: Bruno Sacco; Johann Tomforde, both of Sindelfingen; Anton Reichel, Ditzingen, all of Germany

[73] Assignee: Mercedes Benz AG, Stuttgart, Germany

[21] Appl. No.: 187,527

[22] Filed: Jan. 28, 1994

[30] Foreign Application Priority Data

Jan. 29, 1993 [DE] Germany ............... 43 02 505.6

[51] Int. Cl.6 ............... B62D 25/02; B60R 21/08
[52] U.S. Cl. ............... 296/188; 296/146.6; 296/68.1; 280/749; 280/753
[58] Field of Search ............... 296/188, 189, 146.6, 296/65.1, 68.1, 185; 280/748, 751, 753, 749

[56] References Cited

U.S. PATENT DOCUMENTS

| | | | |
|---|---|---|---|
| 2,798,737 | 7/1957 | Sundlof | 296/189 X |
| 2,839,312 | 6/1958 | Barenyi | |
| 3,001,815 | 9/1961 | Weber | 296/68.1 |
| 3,171,669 | 3/1965 | Barenyi | 296/188 X |
| 3,337,260 | 8/1967 | Proctor | 296/68.1 |
| 3,687,485 | 8/1972 | Campbell | 280/749 X |
| 3,792,901 | 2/1974 | Wernig | 280/753 |
| 3,806,152 | 4/1974 | Witchger | |
| 3,944,276 | 3/1976 | de Rosa et al. | 296/65.1 |
| 3,953,049 | 4/1976 | Surace et al. | 280/749 X |
| 4,438,969 | 3/1984 | Kamijo et al. | 296/188 X |
| 4,451,078 | 5/1984 | Maeda | 296/188 |
| 4,512,604 | 4/1985 | Maeda et al. | |
| 4,906,020 | 3/1990 | Haberer | 280/753 X |
| 4,934,751 | 6/1990 | Shimoda | 296/188 |
| 5,000,509 | 3/1991 | Sinnhuber et al. | 296/188 |
| 5,056,816 | 10/1991 | Lutze et al. | 286/753 X |
| 5,171,058 | 12/1992 | Ishikawa | 296/189 |
| 5,322,322 | 6/1994 | Bark et al. | 296/753 X |

FOREIGN PATENT DOCUMENTS

| | | |
|---|---|---|
| 0288386 | 10/1988 | European Pat. Off. |
| 2816318A | 10/1978 | Germany. |
| 2856437A1 | 7/1980 | Germany. |
| 3607855 | 9/1987 | Germany. |
| 3632877A1 | 3/1988 | Germany. |
| 4121548A1 | 1/1992 | Germany. |
| 95948 | 4/1989 | Japan ............... 296/65.1 |
| 3224820 | 10/1991 | Japan ............... 280/753 |

OTHER PUBLICATIONS

European Search Report.

*Primary Examiner*—Joseph D. Pape
*Attorney, Agent, or Firm*—Evenson, McKeown, Edwards & Lenahan

[57] ABSTRACT

A passenger compartment is disclosed with a transverse stiffener arranged in the region of the seats for passenger cars with restricted passenger compartments. A force-transmitting side member is arranged as a reinforcement element in each side door and a force-transmitting seat crossmember is supported between the two side members so that it can be displaced longitudinally, at least one seat being fastened to the seat crossmember.

11 Claims, 4 Drawing Sheets

PASSENGER COMPARTMENT WITH A TRANSVERSE STIFFENER ARRANGED IN THE REGION OF THE SEATS

BACKGROUND AND SUMMARY OF THE INVENTION

The invention concerns a passenger compartment for a passenger car, with reinforcement elements in at least two opposite side doors and with a transverse stiffener arranged in the region of the seats.

From the German Patent Document 28 16 318, it is known to provide the seats of a passenger compartment and the central tunnel between the two seats with transverse stiffeners. Reinforcement elements are arranged at the level of these transverse stiffeners in the side doors.

An object of the invention is to ensure adequate occupant safety in the case of lateral deformations in a passenger compartment of the type mentioned above with a limited availability of lateral space.

This object is achieved according to preferred embodiments of the invention in that a force-transmitting side member is arranged as the reinforcement element in each of the side doors and in that a force-transmitting seat crossmember, on which at least one seat is fastened, is supported so that it is longitudinally displaceable between the two side members. This seat crossmember therefore accepts lateral impact forces in the immediate vicinity of the vehicle occupants. Because of the longitudinally displaceable support of the seat crossmember, this "protection zone" always remains in the same position relative to the vehicle occupant even if the seat crossmember, and therefore the seats, are displaced. The arrangement between the two side members permits lateral impact forces to be accepted on the respectively opposite side member. Lateral impact forces are therefore initially accepted by the first side member, then by the seat crossmember and, by means of the latter, by the second side member. This concept makes it possible to design even narrow and restricted passenger compartments with adequate safety.

In a development of the invention, a stiff shell is provided for the at least one seat. This provides additional occupant protection.

As a further development of the invention, a support element extending over the length of the seat and parallel to the seat crossmember is arranged in the region of the seat back of the at least one seat. This support element is particularly advantageous where the seat itself is not configured as a stiff shell.

As a further development, stiffening elements are provided at the level of the support element in the region of the two side doors. By this means, a second "protection zone for the occupants, similar to the first "protection zone" resulting from the two side members and the seat crossmember, is formed in the region of the seat back. Because the support element is arranged on the seat, this "protection zone" is displaced with each displacement of the seat.

As a further development of the invention, at least two seats are arranged offset relative to one another on the seat crossmember. By this means, mutual impact between the occupants is avoided in the case of a lateral impact. These seats are arranged adjacent to one another on the seat crossmember without a central tunnel but are offset relative to the center line of the seat crossmember.

As a further development of the invention, deformation elements are provided on both sides of the passenger compartment at the level of the seat position of an occupant. Because of the rigid seat connection on the seat crossmember and the arrangement of this seat crossmember between the two side members, the passenger compartment experiences a shorter deformation path in the case of a lateral impact. The lateral deformation elements are provided in order to compensate for the higher vehicle occupant acceleration forces occurring due to this shorter deformation path. These deformation elements absorb energy between the side wall of the passenger compartment and the occupants.

As a further development of the invention, a head protection element, which is arranged above the seat position of each occupant and which can be moved to one side at the level of the head of the occupant in the case of a lateral deformation of the passenger compartment, is provided for the at least one seat. In a further development, the head protection element is displaceably supported in the region of the roof of the passenger compartment and is connected to at least one actuation element which displaces the head protection element to the side in the case of a lateral impact. In normal driving operation, therefore, the head protection element, which has an energy-absorbing deformation element, is situated under the roof of the passenger compartment, where it impairs neither the sight nor the freedom of movement of the vehicle occupants. It is only in the case of a lateral impact that, in order to protect the head of the vehicle occupant, the head protection element is displaced sidewards between the passenger compartment wall and the head of the occupant.

Other objects, advantages and novel features of the present invention will become apparent from the following detailed description of the invention when considered in conjunction with the accompanying drawings.

DETAILED DESCRIPTION OF THE PREFERRED EMBODIMENTS

Figure 1:
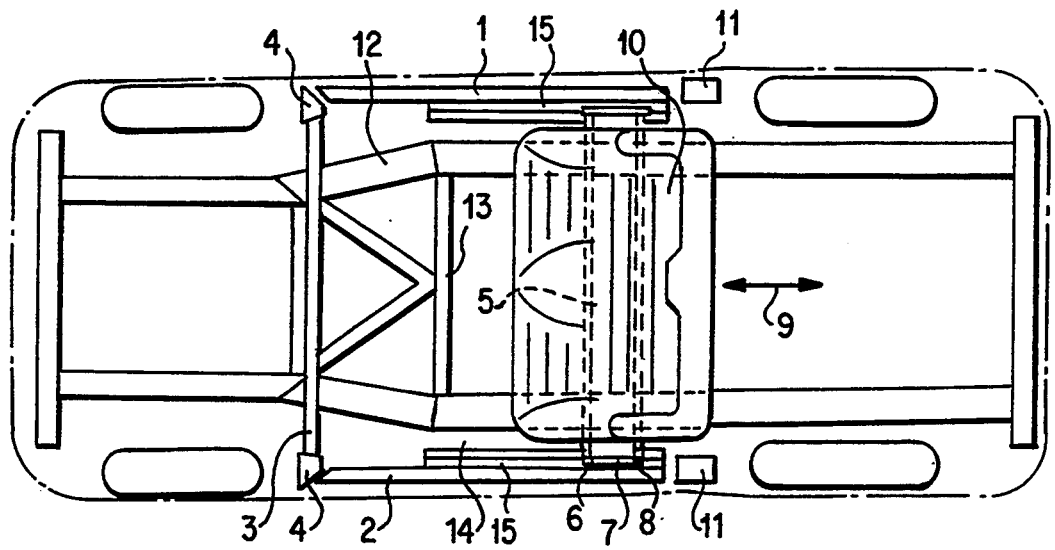
FIG. 1 is a schematic plan view of a passenger car with an embodiment of a passenger compartment, according to the invention, in which a bench seat containing two seats is rigidly connected to a seat crossmember which is supported so that it can be displaced longitudinally between two door side members.
Figure 2:
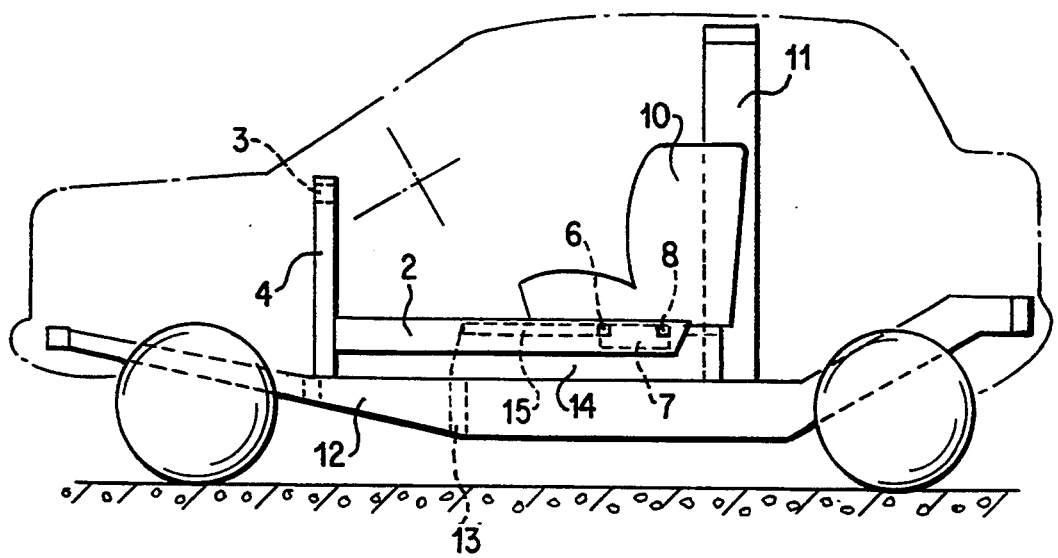
FIG. 2 is a schematic side view of the passenger car of FIG. 1, from which view it may be seen that the seat crossmember and the door side members are arranged at one level.

A passenger car as shown in FIGS. 1 to 5 has two side members (12) which are connected together by means of a plurality of crossmembers (13). Two side sills (1 and 2), which each merge into a respective A pillar (4) towards the front of the vehicle, are also provided under the two side doors (18) in the region of the passenger compartment of the passenger car. The A pillar (4) has a cross-connection (3) at the level of a steering wheel, which is only schematically indicated (FIG. 2). Respective side member (1, 2), which each consist of a force-transmitting steel profile section, are arranged respectively on respective side doors (18) above the associated respective side sill. The bodywork also has a B pillar (11) which also contributes to stiffening the support structure of the passenger car.

A seat crossmember (5), to which is rigidly connected a bench seat (10) of the passenger compartment and which extends through the internal space of the passenger compartment, is arranged between these two side members (1, 2). The seat crossmember (5) presents a stiff frame which consists of two steel profile sections (6 and 8), which form transverse stiffeners, and two end plates (7), which bound the steel profile sections (6, 8) at both ends. The steel profile sections (6, 8) are welded to the two end plates (7). The two steel profile sections (6 and 8) are arranged parallel to one another and at a distance from one another. The height of each end plate (7) corresponds approximately to the height of the side members (1 and 2) (FIG. 2). The seat crossmember (5) is aligned in the horizontal plane with the two side members (1, 2). The seat crossmember (5) therefore forms a rectangular frame which, in terms of its width, is matched to the distance between the two side members (1 and 2) in such a way that each end plate (7) is a small distance away from the respective side member (1, 2).

This distance is necessary in order to ensure a longitudinal displacement of the seat crossmember (5) in the direction of the double arrow (9) and to avoid friction between the end plates (7) end the side members (1, 2). Guide rails (15) adjoining the side doors (18) are fixed in the region of the floor (14) of the passenger compartment for the longitudinal displacement of the seat crossmember (5). These guide rails (15) extend parallel to the door side members (2, 1) and have a length which corresponds approximately to two-thirds of the length of the door side members (1, 2). The guide rails (15) are rigidly connected to the floor (14) of the passenger compartment. The seat crossmember (5) is displaceably supported in these guide rails (15) by means of sliding or rolling elements, which are known per se. In addition, the seat crossmember (5) has locking elements (not shown) by means of which the bench seat (10) can be locked in the guide rails (15) in the desired seat position. The bench seat (10) is rigidly connected to the steel profile sections (6 and 8) of the seat crossmember (5), by welding for example.

In a different embodiment (not shown) of the invention, two seats are arranged on the seat crossmember and these are held so that they can be displaced longitudinally by a certain amount relative to the seat crossmember. By this means, each seat can be individually adjusted but, nevertheless, the "protection zone" for the occupants can be correspondingly moved by the displacement of the seat crossmember, which is independent of the adjustment of the seat.

Figure 3:
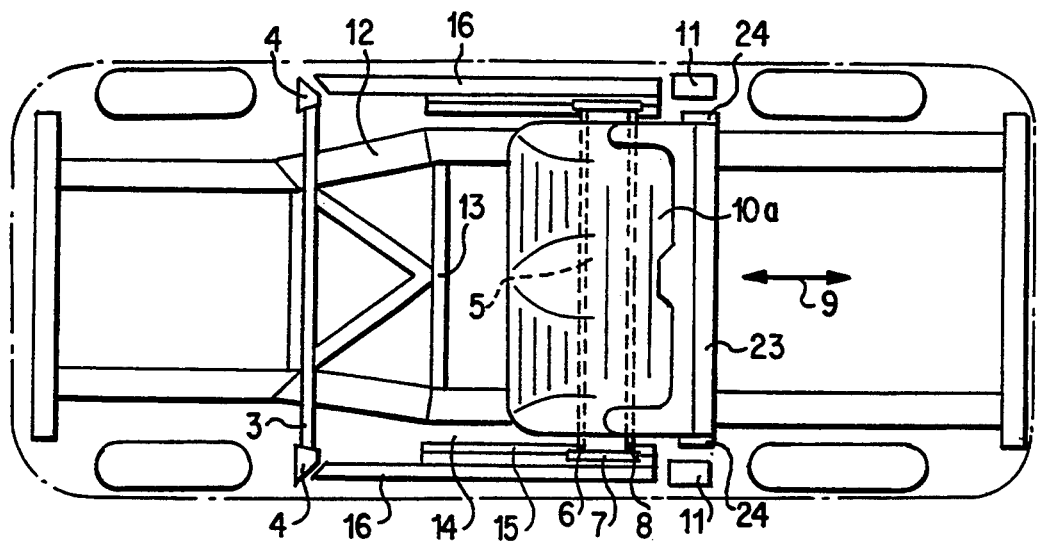
FIG. 3 is a schematic plan view of an embodiment similar to FIG. 1, in which the seat back of the bench seat is reinforced by a stiff support element extending parallel to the seat crossmember.
Figure 3A:
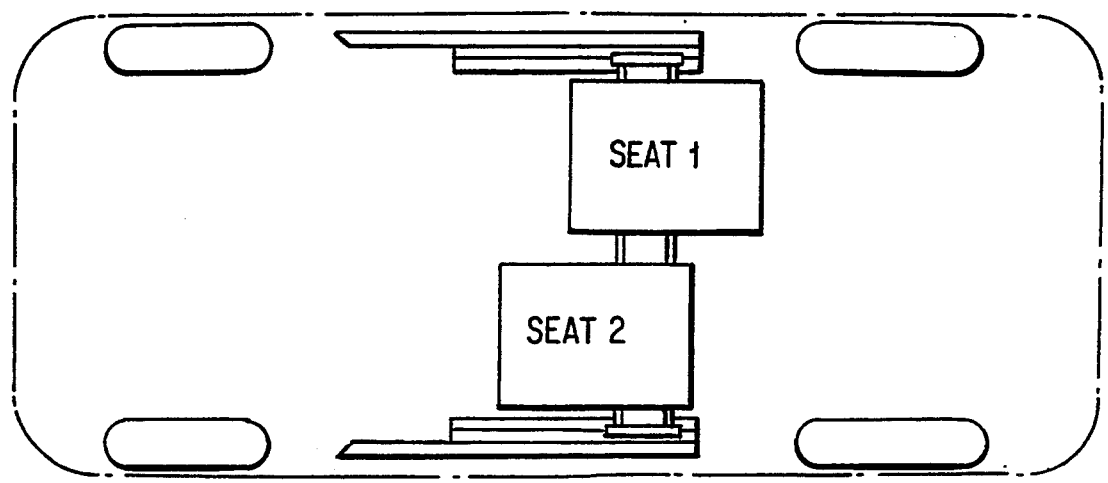
FIG. 3A is a partial schematic plan view showing an arrangement similar to FIG. 3., but with the two seats offset longitudinally from one another.

In a further embodiment of the invention shown schematically in FIG. 3A, two seats are fastened relative to the seat crossmember, offset relative to one another on the seat crossmember. The two vehicle occupants are therefore likewise seated offset relative to one another so that they do not collide in the case of a lateral impact.

In the case of a lateral impact, impact forces in the region of the side doors (18) are accepted by the side sills (14) and the side members (1) and transmitted via the body frame structure, the seat crossmember (5) and the transverse connection (3), the seat crossmember (5) being supported on the side member (2). This produces a stiffened passenger compartment structure which leads to a reduction in the deformation of the passenger compartment.

The bench seat (10) of FIG. 1 and 2 has a stiff plastic shell by means of which the complete bench seat (10) is stiffened. By this means, an additional protection, particularly in the region of the seat back of the bench seat (10), is achieved in addition to the occupant protection provided by the seat crossmember and the door side members (1 and 2). The stiff shell of the bench seat (10) is respectively drawn forwards on both sides in the region of the seat backs so that stiffening resisting lateral impact loads is also present.

Figure 4:
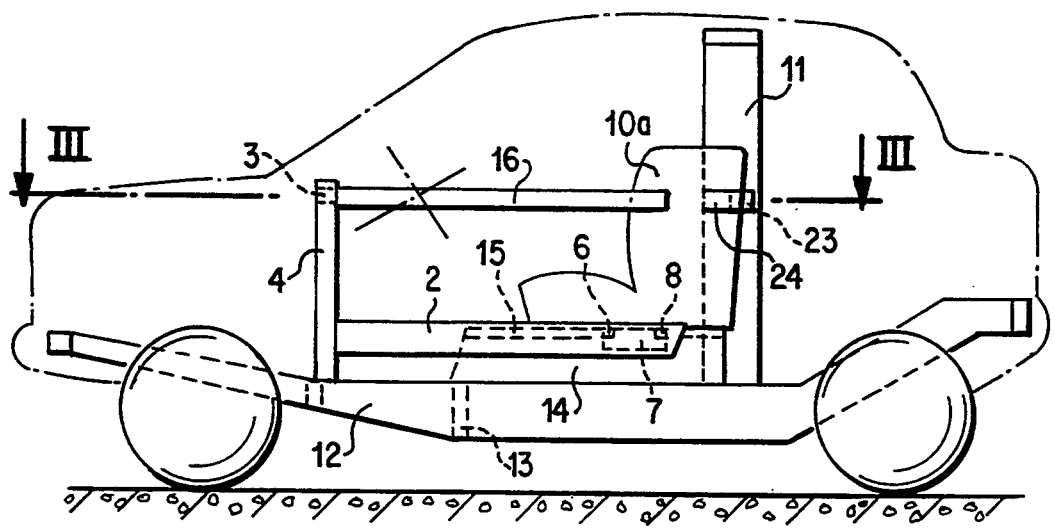
FIG. 4 is a schematic side view of the passenger car of FIG. 3, from which may be seen the arrangement of two additional stiffening elements in the form of side members in the side doors at the level of the support element.

In the embodiment of FIG. 3 and 4, the bench seat (10a) is not stiffened by an additional stiff shell in the region of the seat backs. A support element (23, 24), which is rigidly connected to the seat back parallel to the seat crossmember (5), is provided instead of a stiffening element in the region of the seat back. The support element (23) is manufactured in tubular shape from a high-strength material, steel in the embodiment example, and has a flange-type support element (24), which transmits any side impact loads to the support element (23), in the region of each of its two ends. As may be seen from FIG. 4, two stiffening elements (16), which consist of a stiff material in a similar manner to the door side members (1, 2) and are tubular, are arranged in the two side doors at the level of the support element (23). In FIG. 3 and 4, the bench seat (10a) is displaced into its rearmost position. In this position, the support element (23) is arranged, relative to the stiffening elements (16), behind the latter. In this region, the B pillar (11) undertakes the force transmission to the support element (23). The function and mode of operation of the support element (23) in association with the stiffening elements (16) and the B pillar (11) correspond essentially to those of the seat crossmember (5). The support element (23) therefore offers additional stiffening protection in the region of the seat back also.

In order to compensate for the higher acceleration forces to which the occupants (17) are subjected and which occur because of the stiffeners listed previously, deformable deformation elements (19), which represent foam parts, are provided in the region of the two side doors (18). The configuration described below is described using the embodiments shown in FIGS. 1, 2 and 5 but it can be applied in a similar manner to the embodiments of FIGS. 3 and 4. These deformation elements (19) absorb impact energy between the outer skin of the passenger compartment and the occupants (17) so that the acceleration forces, to which the occupants (17) are subjected, are reduced in the case of a side impact.

In order, furthermore, to form an effective protection for the head of each vehicle occupant (17) in the case of a side impact, head protection elements (21) are provided in the region of the roof of the passenger compartment and these likewise represent energy-absorbing, deformable foam parts. A head protection element (21) is arranged for each occupant (17) under the roof of the passenger compartment and this head protection element (21) can be moved laterally towards the side door (18) at the head level of the occupant (17) in the case of a side impact. For this purpose, each head protection element (21) is displaceably supported in appropriate guides.

Figure 5A:
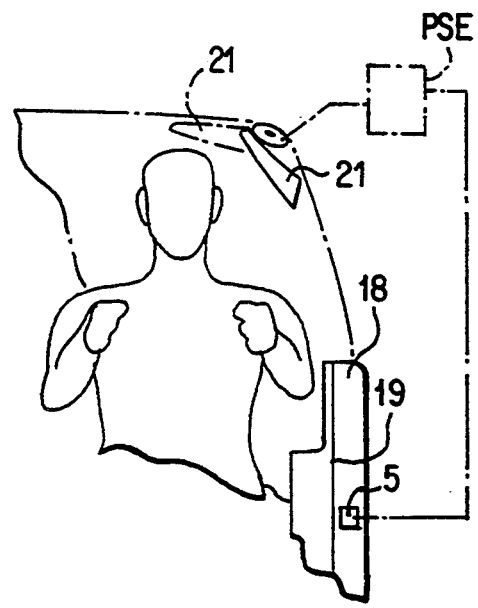
FIG. 5A is a partial schematic front view showing an arrangement similar to FIG. 5, but with a pneumatic setting element for a head protection deformation element
Figure 5:
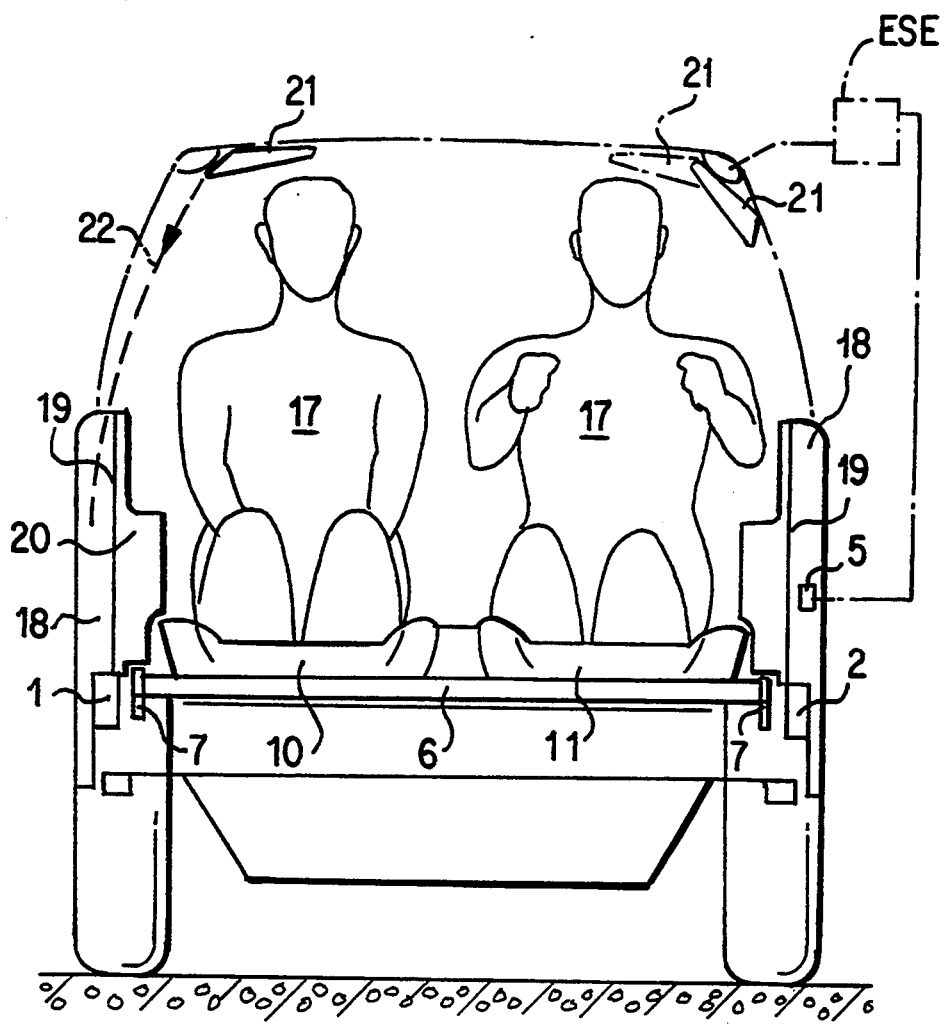
FIG. 5 is a schematic front view of the passenger compartment of FIGS. 1 and 2, in which is shown the arrangement of the lateral deformation elements in the region of the side doors and in the head region of the occupants

A mechanical solution is represented in FIG. 5 for displacing the head protection element (21) in the case of a lateral impact including a tension element arrangement (20, 22) which pulls the head protection element (21) laterally downwards in its guides. A tension element (22) is fastened on the one hand to the deformation element (19) of the side door (18) and is deflected upwards to the head protection element (21) over a deflection point (20). The other end of the tension element (22) is fastened to the head protection element (21). In the case of a lateral impact, the tension element (22) is pulled into the passenger compartment by a deformation of the deformation element (19) so that the head protection element (21) is pulled downwards.

In another embodiment of the invention, schematically depicted in dash lines in FIG. 5 an electrical setting element ESE is provided for displacing the head protection element (21) and this setting element is initiated by means of a sensors in the region of the side door. In a further embodiment shown schematically in FIG. 5A, a pneumatic setting element PSE is provided instead of an electrical setting element and this is likewise initiated by a corresponding sensors in the side door. In a further embodiment of the invention, an airbag is provided as the head protection and this is arranged above the side door of the passenger car.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Passenger compartment for a vehicle comprising:
    first and second passenger doors at opposite lateral vehicle sides;
    first and second stiff deformation resistant side members disposed as vehicle longitudinally extending reinforcement elements in the respective first and second passenger doors;
    at least one longitudinally adjustable displaceable passenger seat disposed between the side members;
    and a transverse stiffener member extending from adjacent the first side member to adjacent the second side member over the transverse length of the at least one passenger seat and serving to directly transmit collision forces between the side members in the event of a side impact collision, said transverse stiffener member being guidably supported to accommodate longitudinal adjustment of the transverse stiffener member,
    said at least one seat being fastened to the transverse stiffener member so as to be adjustably movable therewith.

2. Passenger compartment according to claim 1, wherein a stiff shell is provided for the at least one seat.

3. Passenger compartment according to claim 1, wherein a support element extending over the length of the transverse stiffener member and parallel to the transverse stiffener member is arranged in a region of a seat back of the at least one seat.

4. Passenger compartment according to claim 3, wherein stiffening elements are provided at the level of the support element in a region of the two side doors.

5. Passenger compartment according to claim 1, wherein at least two seats are arranged offset relative to one another on the transverse stiffener member.

6. Passenger compartment according to claim 1, wherein deformation elements are provided on both sides of the passenger compartment at the level of the seat position of an occupant.

7. Passenger compartment according to claim 6, wherein a head protection element is provided for the at least one seat, said head protection element being arranged above the seat position of each occupant and being moveable toward an adjacent vehicle side at the level of the head of the occupant in the case of a lateral deformation of the passenger compartment.

8. Passenger compartment according to claim 7, wherein the head protection element is displaceably supported in a region of the roof of the passenger compartment and is connected to at least one actuation element which displaces the head protection element to the side in the case of a lateral impact.

9. Passenger compartment according to claim 8, wherein a tension element arrangement is provided as the actuation element, which tension element is connected at one end to the side deformation elements and at the other end to the head protection element.

10. Passenger compartment according to claim 8, wherein an electrical setting element is provided as the actuation element.

11. Passenger compartment according to claim 8, wherein a pneumatic setting element is provided as the actuation element.

* * * * *